United States Patent

[11] 3,549,870

| [72] | Inventor | Clark M. Lay<br>Oak Ridge, Tenn. |
|---|---|---|
| [21] | Appl. No. | 629,877 |
| [22] | Filed | Apr. 7, 1967 |
| [45] | Patented | Dec. 22, 1970 |
| [73] | Assignee | The United States of America<br>as represented by the United States Atomic<br>Energy Commission |

[54] SYSTEM FOR COMPUTING AND CONTINUOUSLY DISPLAYING INCREMENTS OF MOVEMENT OF AN OBJECT IN USEABLE UNITS OF MEASURE
1 Claim, 3 Drawing Figs.

[52] U.S. Cl. ................................................. 235/92,
356/106; 340/347
[51] Int. Cl. ........................................................ G06m 3/14,
G06m 3/02
[50] Field of Search ........................................... 235/92EV,
92PL, 92MP, 92EC

[56] References Cited
UNITED STATES PATENTS

| 3,331,006 | 7/1967 | Strand ........................ | 318/314 |
| 3,353,161 | 11/1967 | Toscano ...................... | 340/172.5 |
| 2,754,059 | 7/1956 | Wilcox ........................ | 235/92 |
| 3,414,718 | 12/1968 | McElroy...................... | 235/92 |
| 3,234,360 | 2/1966 | Schooley ..................... | 235/92 |
| 3,209,130 | 9/1965 | Schmidt ...................... | 235/92 |

Primary Examiner—Maynard R. Wilbur
Assistant Examiner—Robert F. Gnuse
Attorney—Roland A. Anderson

ABSTRACT: An accurate and comparatively simple electronic computing circuit provides a digital display of its output. Voltage pulses, each representing one unit (the fringe distance) of forward or backward movement of an object relative to a reference position, taken at the output of an interferometer, are fed into a counter. Gating circuits coupled to the counter alter the pulse count to convert fringe increments to a desired unit of length, such as microinches. The output displays the object-to-reference distance in the desired units.

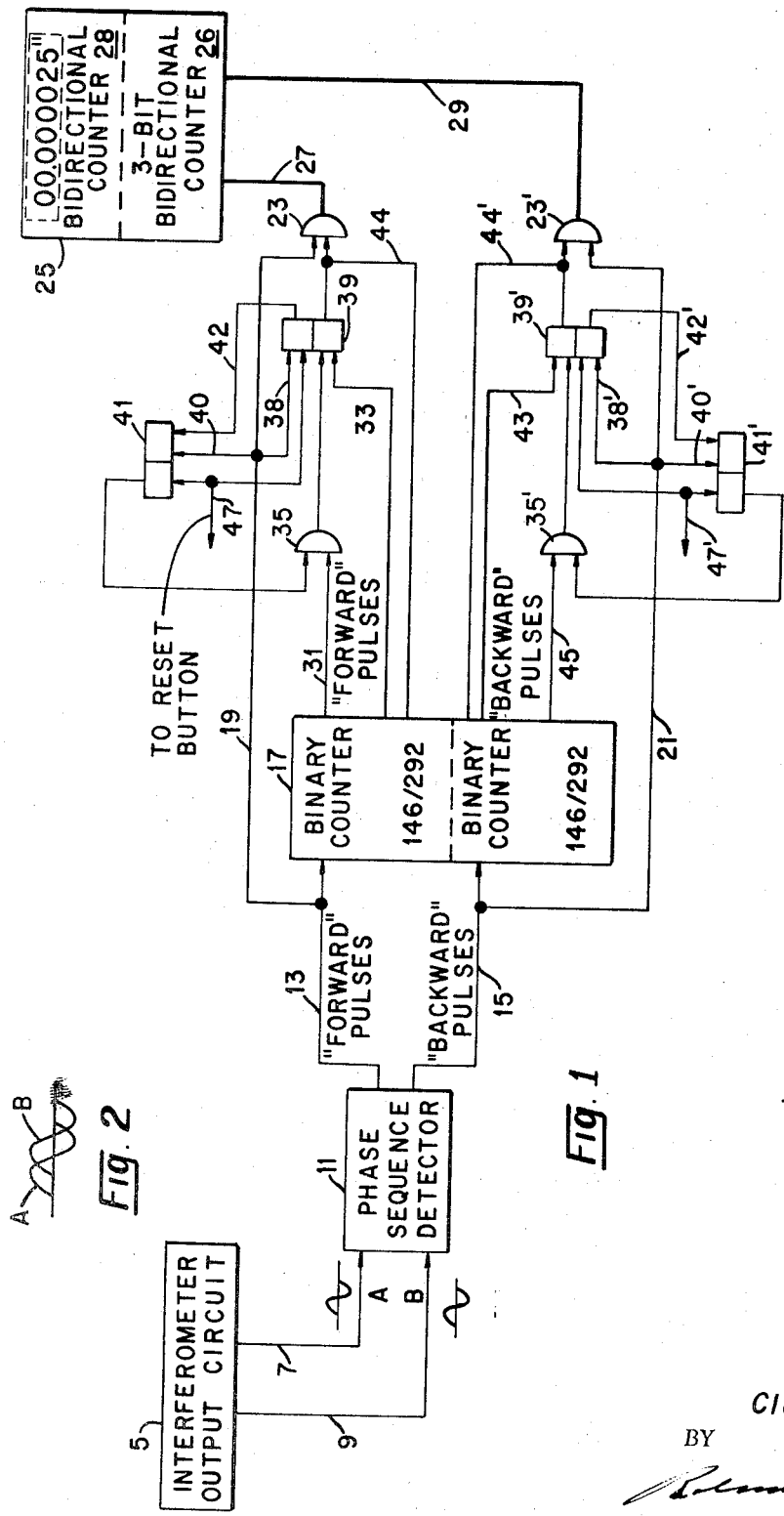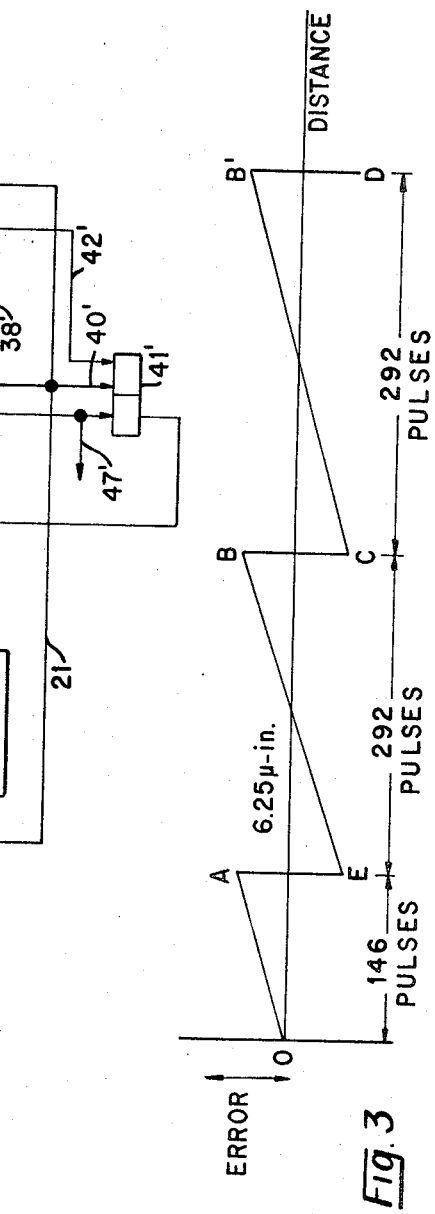
PATENTED DEC22 1970
3,549,870
Fig. 1
Fig. 2
Fig. 3
INVENTOR.
Clark M. Lay
BY
ATTORNEY.

SYSTEM FOR COMPUTING AND CONTINUOUSLY DISPLAYING INCREMENTS OF MOVEMENT OF AN OBJECT IN USEABLE UNITS OF MEASURE

BACKGROUND OF THE INVENTION

This invention relates broadly to electronic computing circuits which provide a digital display of their output, and more particularly to an accurate and comparatively simple circuit which, when fed with voltage pulses each representing the same amount of forward or backward movement of an object relative to a reference position, continuously displays the object-to-reference distance in microinches or the like.

This invention was made during the course of, or under, a contract with the U.S. Atomic Energy Commission.

The present circuit may be used with a numerically controlled, continuous path inspection machine provided with laser interferometer feedback. Each slide of this machine is provided with a corner cube interferometer which develops two fringe patterns which are 90° out of phase. Conventional light-responsive circuitry is employed with each interferometer to sense which of the two patterns reaches maximum intensity first, and to develop two corresponding sinusoidal output voltages. Forward movement of the slide carrying the interferometer causes one of the voltages to lead the other by 90°; backward movement causes the other voltage to lead by 90°. One cycle of the voltages is generated each time that the machine slide moves through a fringe distance (i.e., 12,457190 microinches).

In systems of the kind just described, it is often desired to provide a read-out of the machine slide position. This is commonly done in an indirect manner by means of circuitry which counts the voltage cycles generated by the feedback circuit and which continuously displays the slide-to-reference position distance in terms of the equivalent number of fringe increments. That is, the circuit displays the machine position in terms of the corresponding number of fringe increments. It is then necessary for the machine operator or the data taker to convert the number of increments shown by the digital display to microinches or the like by means of a calculator. The conversion consists of multiplying the displayed number by the distance equivalent to a wave length of the interferometer fringes (in the present system, this is a nominal distance of 12,457190 microinches). It will be apparent that this indirect form of read-out is inconvenient and time consuming, especially in applications where data are being taken continually.

Electronic multipliers are available commercially for accomplishing the conversion just described. These multipliers display the slide position in microinches, but they are, in effect, small computers and are very expensive. This cost is prohibitive for many applications, particularly when it is considered that a computer is required for each machine slide of interest.

SUMMARY OF THE INVENTION

Briefly, the present invention calls for a circuit which computes and continuously displays the position of an object with respect to a point of reference. As part of known commercial instruments, a signal source produces "forward" and "backward" signals at respective outputs, the sequence of which is determined by the direction of movement of the object, and a detector coupled to the source produces a pulse at one or the other of its respective outputs, depending upon disabling sequence of the input signals. This invention includes a binary counter connected to respective detector outputs, the binary counter having first and second counting stages responsive to "forward" and "backward" pulses, respectively; first and second normally enabled gates coupled to corresponding detector outputs; a bidirectional display counter connected to both of the output gates for counting the pulses from the detector and displaying predetermined units of movement responsive to the pulse count applied thereto; and first and second control circuits connected respectively to selected stages of the first and second counting sections of said binary counter for disabling one of the output gates to block the passage of the next succeeding pulse to said bidirectional counter upon occurrence of a predetermined number of pulses and for subsequently reenabling said last-named output gate to pass succeeding pulses.

The present circuit is quite useful in converting a machine slide movement into useable units, with acceptable accuracy, without the use of an expensive computer or laborious manual calculations.

It is, therefore, an object of this invention to provide an electronic computing circuit which converts increments of movement of a numerically controlled positioning device into useable units of measure, which is accurate and comparatively simple.

Other objects and many of the attendant advantages of the present invention will become evident from the following description when taken in conjunction with the accompanying drawings.

BRIEF DESCRIPTION OF THE DRAWINGS

FIG. 1 is a block diagram representation of a fringe-to-inches converter according to the present invention.

FIG. 2 is a graphic illustration of a typical voltage pulse input to the circuit.

FIG. 3 is a graphic illustration of a correction technique employed in the circuit shown in FIG. 1.

DESCRIPTION OF THE PREFERRED EMBODIMENT

Referring to FIG. 1, reference numeral 5 designates an output circuit of a conventional interferometer which is designed to develop quadrature voltages A and B, as shown in FIG. 2, responsive to two fringe patterns which are 90° out of phase. Depending upon the direction of motion of a device such as a machine slide on which the interferometer is mounted, voltage A will lead or lag voltage B by 90°, forward movement of the slide causing A to lead and backward movement of the slide causing B to lead. One cycle of the sinusoidal voltages A and B is generated each time that the slide moves through a fringe distance (12.457190 microinches). As shown in FIG. 1, quadrature voltages A and B are fed through leads 7 and 9, respectively, connected between the interferometer output circuit and a suitable phase-sequence or phase-reversal detector 11 such as the Janus Control Corporation Bidirectional Polarity and Control Module, Model No. B100-85. The phase detector 11 is adapted to sense which of the voltages A or B is leading and develops one square wave output pulse for each cycle of the leading voltage. Assuming that forward movement of the device whose movement is to be measured causes voltage A to lead, the detector 11 responds by impressing its output pulses on a "forward" feedback line 13. If voltage B leads, the detector output is impressed on a "backward" feedback line 15.

Lines 13 and 15 are connected to a binary counter 17 and gates 23 and 23' through lines 19 and 21, respectively. Counter 17 consists of two symmetrical parts, one for counting "forward" pulses and one for counting "backward" pulses. Gates 23 and 23' act as normally open gates and allow pulses to be coupled into a bidirectional counter 25 through lines 27 and 29, respectively. Counter 25 consists of two stages, a three-bit bidirectional counter 26 and a bidirectional display counter 28 interconnected with counter 26. Counter 26 provides a scale-of-eight input to counter 28. That is, each time the counter receives eight "forward" pulses, or counts, bidirectional counter 26 generates a "forward" output pulse. Likewise, when it receives eight "backward" pulses, it generates a "backward" output pulse.

As shown, the digital display of counter 25 is provided with six places to the right of the decimal point. The counter is preset to change its display by 12.5 microinches (0.000125 inches) each time that an input pulse is received from gate 23 or 23'. Thus, assuming that the display is at zero, if four successive "forward" feedback pulses are received, the following numbers will be displayed successively: 12-25-37-50. To be exact, some of these numbers should display a "5" in the next decimal place e.g., "12.5"). This additional figure, representing only a half microinch, is neglected. On the eighth "forward" pulse, the three-bit counter 26 generates one "forward" pulse, causing the display of bidirectional counter 28 to go to 100, which is exactly 8 times 12.5. "Backward" pulses count down the display in analogous fashion; for example, if the display is 100 and the next feedback pulse received is a "backward" pulse, the display is counted down to 87.

The basic principle involved in the circuit as disclosed so far is that a voltage pulse is considered to represent a slide movement of exactly 12.5 microinches, rather than the actual value of 12.457190. This assumption necessitates, of course, some kind of correction circuitry. Assume, for example, that all of the counters have been cleared of counts and that the machine slide moves forward sufficiently to generate eight "forward" pulses. The counter 25 now will display 100, as explained above. This display would be in error by 1.302480 microinches (eight times the difference between the assumed movement of 12.5 microinches per pulse and the actual movement per pulse). The purpose of the remainder of the subject circuit is to reduce this error to an acceptable value. For the purpose of illustration, an acceptable value is defined herein as a cumulative error of not more than one fringe (12.457190 microinches) for an extended machine slide movement in either direction which is a distance of approximately 38 inches.

In order to correct this problem, the following correction control circuit is provided which constitutes the remainder of the circuitry of FIG. 1. As shown, "forward" pulses are coupled from counter 17 via lines 31 and 33, respectively, to a gate 35 and a set input of a flip-flop 39, respectively. Lines 31 and 33 are connected to predetermined count stages of counter 17, so that, as the counter counts the received pulses, an output is obtained on one of the lines when the count reaches the stage to which that particular line is connected. The output of gate 35 is also connected to the set input of flip-flop 39 whose reset output is connected to an input of gate 23. A set output of flip-flop 39 is connected to an enabling input of flip-flop 41 via line 42 for transmitting an enabling pulse to flip-flop 41. The set output of flip-flop 41 is connected to an input of gate 35, coupling a disabling voltage to gate 35 when flip-flop 41 is set. Further, flip-flops 39 and 41 are connected to line 19 via lines 38 and 40, respectively, for the purpose of resetting flip-flop 39 and setting flip-flop 41 on the next succeeding pulse after the flip-flop 39 has been set. When flip-flop 39 is reset, it also resets and clears counter 17 via line 44 connected between the reset output of flip-flop 39 and counter 17.

"Backward" pulses are coupled from counter 17 via lines 43 and 45 to a second control circuit channel analogous to the circuit described above with corresponding parts indicated by like reference numerals.

The operation of the correction circuitry may best be exemplified with reference to FIG. 3. By dividing the error per pulse (0.042810) into the distance assumed to be represented by the pulse (12.5), the number of pulses is obtained which can be generated in either direction before the cumulative error is almost exactly equal to the distance represented by one pulse or one fringe increment. This number of pulses is 292. This means that, after a slide movement equivalent to 291 pulses, the number display of counter 25 can be corrected almost exactly if the next pulse, the 292nd, is eliminated from the input to the counter 25. This eliminates 12.5 microinches from the display, bringing the displayed number into nearly exact correspondence with the actual position of the machine slide. The above-described circuit accomplishes this correction.

Referring now to FIG. 3, an even better correction can be obtained by centering the 292-count error (12.5 microinches) about the zero-error line. This can be accomplished at the beginning of a measuring operation by eliminating the 146th pulse from the input to the bidirectional counter 25. As indicated at A, the accumulated error at the 146th pulse is 6.25 microinches, and the elimination of the 146th pulse overcorrects by the same amount (as indicated at E). As shown, this 146th-pulse correction is made only once, at the beginning of a measuring operation when flip-flops 39 and 41 are in the "reset" condition and all the counters are cleared. After the initial correction is made, periodic corrections of the kind previously described are made as indicated at B and B'. That is, a pulse is eliminated each 292nd pulse following the initial correction. As shown in FIG. 3, the initial correction ensures that the "correctible error" never exceeds 6.25 microinches.

Thus, the automatic correction circuitry for the bidirectional counter 25 is designed to eliminate from counter 25 input (1) and 146th pulse following the start of a measuring operation and (2) the pulse following each succeeding block of 291 pulses.

Referring again to FIG. 1, assume that a measuring operation has begun and that 145 "forward" pulses have been generated by the detector 11. These have been fed into counter 25 by means of line 19 and the normally open gate 23. These counts also have been fed into the "forward" portion of binary counter 17. When counter 17 has counted 145 "forward" pulses, it passes a voltage pulse via line 31 to gate 35, setting flip-flop 39. When this flip-flop goes set, it enables flip-flop 41. The next pulse, the 146th sets flip-flop 41 via line 40, disabling gate 35. When flip-flop 39 is set, it also disables gate 23 in the input line to counter 25. As a result, the next pulse (the 146 the from detector 11 is blocked from counter 25. This same pulse (146 the resets flip-flop 39 via line 38 to reenable gate 23. Thus, only the 146 the pulse is eliminated from input. Flip-flop 41 maintains gate 35 disabled until the entire circuit of FIG. 1 is reset manually via reset line 47 connected to the reset portion of both flip-flops 39 and 41. in the input line to counter 25. As a result, the following pulse (the 146th) from detector 11 is blocked from counter 25. This same pulse 146th resets flip-flop 39 via line 38 to reenable gate 23. Thus, only the 146th pulse is eliminated from the input. Flip-flop 41 maintains gate 35 disabled until the entire circuit of FIG. 1 is reset manually via reset line 47 connected to the reset portion of both flip-flops 39 and 41.

When flip-flop 39 is set, it clears and resets counter 17 via line 44 connected to the "forward" portion of counter 17. After this circuit has received 291 counts (starting at E, FIG. 3), it transmits a voltage pulse via line 33 to set flip-flop 39 and disable gate 23. In contrast to the 146-count circuit mentioned above, the 292-count circuit is not self-disabling, but rather operates repetitively (as indicated in FIG. 3).

The other portion of counter 17 is adapted to respond to "backward" pulses applied via line 15 from detector 11, and operates in an analogous manner to provide the initial correction following the 146th "backward" pulse, as well as the periodic correction each 292 pulses thereafter. The circuits in counter 17 need be designed for a maximum of only 292 counts, permitting the use of a comparatively inexpensive counting circuit.

It should be noted that there is a small amount of uncorrectible error because the elimination of the 292nd pulse does not compensate exactly for the error incurred by assuming that the movement per pulse is 12.5 microinches. The uncompensated amount is about 0.2 microinch per inch of slide travel. This means that a slide travel of 38 inches in either direction is permissible before the total error (0.2 microinch per inch, plus the 6.25-microinch maximum shown in FIG. 3) exceeds the acceptable value of 12.457190.

Referring again to FIG. 3, it is possible that immediately after the circuit eliminates a 292nd pulse (thus shifts the number display from point B to point C, relative to the zero line), the control system for the machine may call for a reversal of movement. To keep the error curve centered about the zero line, auxiliary circuitry (not shown) senses the direction of the 293rd pulse. If this pulse is of opposite direction to those preceding, the circuit eliminates it from the input to counter 25, restoring the display to point B. This is done to remove the 6.25-microinch overcorrection (D, FIG. 3), which is provided on the assumption that movement will continue in the same direction.

Thus, it will be seen that a fringe-to-inches converter is provided which can convert a machine slide movement into useable units, with acceptable accuracy and without the use of an expensive computer or laborious manual calculations.

It will be understood that, while the preferred embodiment has been set forth above, the invention is not limited thereto and various other additions, embodiments, and applications can readily be made without departing from the spirit and scope of the invention as set forth in the appended claims.

I claim:

1. Means for computing and continuously displaying the displacement of a movable object from a reference point in useable units of measure upon receipt of signals from a signal source actuated by said object to produce "forward" and "backward" signals at respective outputs indicative of increments of displacement, the sequence of which is determined by the direction of movement of said object and a detector coupled to said source to produce a pulse at one or the other of its respective outputs, depending upon the sequence of said signals, comprising:

a binary counter connected to respective outputs of said detector, said binary counter having first and second counting sections responsive to "forward" and "backward" pulses, respectively;

first and second normally enabled output gates coupled to corresponding detector outputs a bidirectional display counter connected to both of said output gates for counting the pulses from said detector and displaying predetermined units of measure responsive to the pulse count applied thereto; and first and second control circuits connected respectively to selected stages of said first and second counting sections of said binary counter, each of said control circuits including a control gate coupled to a first output of the corresponding section of said binary counter and responsive to a first predetermined count registered therein, a first flip-flop having a set input connected to the output of said control gate, said first flip-flop having a set output connected to one of said normally enabled output gates for disabling said output gate when said first flip-flop is set, a second flip-flop having an enabling input connected to a reset output of said first flip-flop, said second flip-flop having a set input connected to a corresponding output of said detector for setting said second flip-flop on the next succeeding pulse after being enabled by said first flip-flop, said second flip-flop having a set output connected to a disabling input of said control gate, reset means connected to said first and second flip-flop for resetting said flip-flops, a second output of the corresponding section of said binary counter connected to a set input of said first flip-flop for setting said first flip-flop responsive to a second predetermined pulse count registered in said binary counter, said first flip-flop having a reset input connected to a corresponding output of said detector whereby said first flip-flop is automatically reset on the next succeeding pulse following said second predetermined pulse count to said binary counter and said reset output of said first flip-flop being connected to a reset input of the corresponding section of said binary counter for resetting said counter each time said first flip-flop is reset.